US012611829B2

(12) United States Patent
De La Mota Mendiola et al.

(10) Patent No.:  US 12,611,829 B2
(45) Date of Patent:       Apr. 28, 2026

(54) METHOD FOR MANUFACTURING A VESSEL AND A DOUBLE-WALL TANK

(71) Applicant: Airbus Operations S.L.U., Getafe (ES)

(72) Inventors: Matilde De La Mota Mendiola, Getafe (ES); Jesús Javier Vázquez Castro, Getafe (ES); Asunción Butragueño Martínez, Getafe (ES); Jorge Ballestero Méndez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 429 days.

(21) Appl. No.: 18/307,263

(22) Filed: Apr. 26, 2023

(65) Prior Publication Data

US 2023/0347607 A1     Nov. 2, 2023

(30) Foreign Application Priority Data

Apr. 29, 2022    (EP) ..................................... 22382413

(51) Int. Cl.
B29D 22/00          (2006.01)
(52) U.S. Cl.
CPC .................................. B29D 22/003 (2013.01)
(58) Field of Classification Search
CPC ......... B29C 70/36; B29C 70/54; B29C 70/68; B29D 22/003; B29L 2022/00; F17C 1/16; F17C 2201/0109; F17C 2203/0663; F17C 2209/227
USPC ....................................................... 156/285
See application file for complete search history.

(56) References Cited

U.S. PATENT DOCUMENTS

| | | | |
|---|---|---|---|
| 4,773,952 A | 9/1988 | Wesley, Jr. | |
| 9,566,748 B2 * | 2/2017 | Chou ........................ | E04C 5/07 |
| 2006/0169704 A1 | 8/2006 | Brunnhofer | |
| 2021/0254787 A1 | 8/2021 | Takami et al. | |
| 2022/0099251 A1 | 3/2022 | Katano | |

FOREIGN PATENT DOCUMENTS

| | | |
|---|---|---|
| EP | 2759758 B1 | 12/2020 |
| WO | 2013168080 A1 | 11/2013 |

OTHER PUBLICATIONS

European Search Report for European Patent Application No. 22382413 dated Oct. 20, 2022; priority document.

* cited by examiner

*Primary Examiner* — James D Sells
(74) *Attorney, Agent, or Firm* — Greer Burns & Crain Ltd.

(57)                    ABSTRACT

A method for manufacturing a vessel configured for housing a fluid within, the method including: providing at least two at least partially cured fiber reinforced polymer (FRP) structures with complementary shapes configured for matching with each other such that an interior volume is defined when the at least partially cured FRP structures are coupled to each other; coupling the at least partially cured FRP structures to each other such that the interior volume is defined; winding at least one layer of FRP material onto at least a portion of the at least partially cured FRP structures once coupled to each other; and applying a curing cycle to cure the resulting assembly.

18 Claims, 3 Drawing Sheets

METHOD FOR MANUFACTURING A VESSEL AND A DOUBLE-WALL TANK

CROSS-REFERENCES TO RELATED APPLICATIONS

This application claims the benefit of the European patent application No. 22382413.7 filed on Apr. 29, 2022, the entire disclosures of which are incorporated herein by way of reference.

FIELD OF THE INVENTION

The present invention belongs to the field of fluid storage systems and manufacturing methods thereof. Particularly, it refers to a method for manufacturing a vessel by means of integrating at least partially cured components which are afterwards cured together once they have been assembled and equipped.

More in particular, the invention refers to a method for manufacturing a double-wall tank provided with thermal insulation between the inner vessel which houses a fluid in cryogenic conditions, such as liquid hydrogen, and the outer wall of the double-wall tank.

BACKGROUND OF THE INVENTION

Due to environmental reasons, challenges to reduce the use of fossil fuels must be increasingly faced. In this scenario, green hydrogen produced on the basis of renewable energy is a reasonable candidate for efficient energy supply. Its high energy density makes it an emerging alternative fuel for aircraft applications.

In particular, hydrogen is an attractive fuel for high-altitude aircraft because it contains about 2.8 times the energy per pound as compared with traditional hydrocarbon fuels. Therefore, in aircraft applications the high specific energy of hydrogen may be a key enabler. However, practical considerations have largely prevented its use. While the specific energy of hydrogen is very high, the energy per unit volume is comparatively low. Liquid hydrogen enhances its energy density relative to the gaseous form while a reduction of the mass of the tank required to confine the hydrogen within as a result of the lower pressure in liquid state. Liquid hydrogen at 20 K and 1 bar pressure has a density of 70 g/l compared to the 40 g/l of gaseous hydrogen at 88 K and 700 bar. Only cryo-compressed hydrogen has a higher density, with a value of 80 g/l at 38 K and 300 bar. According to these parameters, the liquefied cryogenic form allows efficient storage at low pressure, and is a viable option for long flight duration aircraft.

In this regards, liquid di-hydrogen (LH2) cryotanks are one of the key components of the structure of future generations of heavy lift launch vehicles, space exploration structures and new green aircraft. It is in aircraft where the greatest challenges lie in developing hydrogen storage systems as a result of the need for reduced weight in combination with longest dormancy time requirements leading to good insulating and permeation properties. Some of the key challenges are geometry, temperature, pressure, permeation, thermal insulation, hydrogen embrittlement, vacuum tightness, system integration inside the tank and the tank integration in the aircraft structure.

In order to take advantage of the high specific energy of hydrogen, the associated tanks should be preferably light weight and must be insulated. The method of insulating a tank must deal with several types of heat transfer: conduction through solids, conduction and convention through gas, and radiation. Some methods of effecting high-performance insulation rely on a vacuum to nearly eliminate the conduction and convection gas heat transfer.

Taking into account the aforementioned conditions, the solutions developed by the industry that are currently in use consist of tanks that include structures and elements such as the following:

Double-wall tanks comprising an outer jacket and an inner metallic pressure vessels. These vessels are normally made from aluminum or steel, and are among the most conventional tanks used, mainly because they are economical and reliable tanks. However, they are also the heaviest type of tanks used for confining cryo-compressed hydrogen.

Metallic pressure vessel/liner with a composite reinforcement overwrap. The metal and the composite material share structural load. Manufacturing costs with respect to the previous alternative are reduced and also the weight is significantly reduced.

SUMMARY OF THE INVENTION

In a first inventive aspect, the invention provides a method for manufacturing a vessel configured for housing a fluid within, the method comprising:

- a) providing at least two at least partially cured Fiber Reinforced Polymer (FRP) structures shaped with complementary coupling interfaces configured for matching with each other, such that an interior volume is defined when the at least partially cured FRP structures are coupled to each other;
- b) coupling the at least partially cured FRP structures to each other such that the interior volume is defined;
- c) winding at least one layer of FRP material onto at least a portion of the at least partially cured FRP structures once coupled to each other; and
- d) curing the assembly resulting from step c).

The properties of any FRP structure, or composite material are determined by the manufacturing process conditions. Accordingly, throughout this entire document, a 'partially cured, or 'pre-cured', fiber reinforced (FRP) structure', should be understood as structures composed of composite materials—in particular materials comprising a thermoset polymer—which have undergone an incomplete curing cycle, or 'partial curing cycle' compared to the application of a complete curing cycle under predetermined duration and temperature conditions according to which the FRP structures have reached the desired chemical and mechanical properties, and so can be considered as 'completely cured', or simply 'cured'. Accordingly, the 'at least partially cured FRP structures' can be regarded as either FRP structures which are provided after having undergone an incomplete or a complete curing cycle.

'Prepreg' is a composite material made from "pre-impregnated" fibers and a partially cured polymer matrix, such as epoxy or phenolic resin. The matrix is used to bond the fibers together. The curing process induces chemical reactions that create extensive cross-linking between polymer chains to produce an infusible and insoluble polymer network. During cross-linking at sufficiently high temperatures, the material changes from a liquid via a gel into a glass-like solid.

Accordingly, the at least partially cured FRP structures are processed so as to reach a degree of cure according to which the matrix has a higher molecular weight than typical resins in order to reduce resin flow, which provides a certain stiffness which facilitates handling, storage and later processing properties. Among the later or subsequent processing properties are considered, for example, the need for the at least partially cured FRP structures to be provided with sufficient stiffness to be coupled to each other according to step b), and to serve as a support (i.e., "tooling" or "mold") for the material provided according to step c) of the method, while maintaining their dimensional stability and structural integrity.

With respect to the lay-up techniques referred to throughout the document, Automated Tape Laying (ATL), or Automated Fiber Placement (AFP), both processes are functionally similar, comprising applying resin-impregnated fiber material (the so called 'prepreg'). However, each process is used differently to achieve specific structure construction goals to provide strength or stiffness where needed. Particularly, the use of one or the other mainly depends on the geometry complexity of the part to manufacture, in which AFP allows higher curvatures.

The 'tooling' shall be understood as the set of instruments and tools that are used and contribute to optimizing the performance of the manufacturing process operations of the FRP structures, or composite materials. Examples of 'tooling' comprise:

molds;

vacuum bags;

caul plates;

heating equipment;

Typically, a number of composite plies or tapes are laid-up one upon the other on a mold, thus resulting in a stack of plies. In this regard, a 'ply' should be understood as a single continuous area of composite material to be laid on a form, where two plies in the same layer do not normally overlap. The laying-up of plies forms a stack which is known as a 'laminate' or as a whole 'preform'. The molds, mandrels or male molds should be regarded as shaping surfaces for manufacturing an item on the mold so that the item acquires the shape of the mold at least on its face in contact with the mold.

Additionally, the fibrous material reinforcement may be glass (for Glass Fiber Reinforcement Polymer, 'GRFP'), carbon (for Carbon Fiber Reinforcement Polymer, 'CRFP'), polymer fibers or any other conventional material used as reinforcement.

Among them, carbon is preferred.

On the other hand, the form-up step (the so-called 'preforming') may be done by two different technologies, hot forming or press-forming. Briefly, hot-forming uses a membrane and heat, whilst the press-forming uses a press and force.

Therefore, multiple combinations of manufacturing processes (i.e., related to tool options) can be used.

Hydrogen Embrittlement is a form of hydrogen damage stemming from the diffusion of atomic hydrogen into certain types of metals due to the cryogenic temperatures range to keep hydrogen in liquid state. In the presence of hydrogen, metallic materials lose their ductile properties and become vulnerable to brittle fracture. Crack initiation and propagation can occur internally and on the surface of a component.

Once they have been pre-cured, the FRP structures provided in step a) are ready to be assembled (i.e., coupled to each other) in such a way as to define an interior volume where the fluid is intended to be confined. In this sense, it will be understood that the at least partially cured FRP structures are provided with a complementary geometry or shape such that they can couple to each other, according to step b), by means of a coupling interface which, in an embodiment, can be the contour and boundaries of the at least partially cured FRP structures, which are outlined so as to match with each other.

Complementary geometry to facilitate the coupling of the FRP structures and improve their tightness afterwards may be such as tongue and groove, flanges, etc.

This way of providing a series of separate parts (the at least partially cured FRP structures) that are assembled at a later stage to give rise to the final geometry of the vessel, enables the installation inside the vessel of various systems and structural elements in a comfortable manner. In particular, a plurality of internal systems, such as anti-sloshing walls, pipes, baffle rings, optical guides and/or level sensors can be installed separately in the at least partially cured FRP structures before they are coupled to each other.

Advantageously, due to the sequential concept proposed by the method of the invention, according to which a vessel is manufactured by coupling at least partially cured FRP structures which are then wrapped and subjected to a final curing process, systems and structural elements are integrated in a much more efficient and flexible manner compared to other configurations wherein the interior volume which houses the fluid within is manufactured as a monolithic/single piece and/or in a one-shot process.

Additionally, by virtue of the aforementioned sequential concept, the method also envisages the provision of 'discontinuities' in the final geometry of the vessel, the discontinuities being adapted for the installation and/or insertion of external elements such as pipes, tubing, or other auxiliary system supports. In this sense, a 'discontinuity' shall be understood as a lack of continuity of the ply and/or the laminate; that is, such as a cut, a notch, or a breakthrough hole.

Advantageously, these discontinuities also contribute to balancing the pressure during, for example, the curing cycle applied in step d), according to which the at least partially cured FRP structures coupled to each other, along with the FRP wrapping (i.e., enveloping) the structures, are cured.

According to conventional manufacturing processes, these kind of discontinuities are normally provided at a separate step by any finishing operation (e.g., numerical cutting process), thus increasing the number of manufacturing stages.

On the contrary, according to the method of the invention, any discontinuity may be introduced during the laying-up process of a FRP structure either in a middle section of the FRP structure or by profiling the contour (i.e., the coupling surface). In particular, the complementary geometries of the coupling surfaces can be shaped such that, when the FRP structures are coupled according to step b), the discontinuities are formed along the joint between the FRP structures. For example, a half-hole may be formed in each FRP structure such that when two FRP structures are coupled, a hole for the passage of a tube is formed at their junction.

After the at least partially cured FRP structures have been coupled according to step b), the resulting assembly is wrapped, preferably wrapping the entire assembly, by providing a layer of FRP material preferably by automated fiber placement (AFP), or by filament winding techniques.

With respect to the 'filament winding' technique, it should be understood as a composite material structures manufacturing process used mainly for hollow parts, generally circular or oval section components, such as pipes and containers, and consisting of winding tensioned reinforcing fiber filaments and/or tapes, impregnated with a thermosetting resin, on male mold or mandrel. Conventionally, the male mold is rotated, while a carriage moves horizontally, orienting the fibers in the desired pattern. Once the male mold is completely covered to the desired thickness and distribution pattern of filaments, the resin may be cured. Once the resin has been cured, the male mold is removed (unmold process), leaving the final product hollow.

Filament winding is a process that can be automated, where the tension of the filaments can be carefully controlled. The orientation of the filaments can also be carefully controlled so that the layers are laminated and oriented differently from the previous layer. The angle at which the fiber of the lower layers is established determines the properties of the final product.

Advantageously, the method simplifies the tooling concept and reduces the associated resource costs because, having coupled the at least partially cured FRP structures according to step b), the resulting assembly itself serves as a male mold on which the filament winding process takes place. That is, the coupled at least partially cured FRP structures serve as tooling for the successive step of fiber lay-up and final curing cycle according to step d). Moreover, the tension applied on the wound filament also maintains the FRP structures against each other during their winding.

The use of composite material both for the FRP structures, as well as for the outer layer wrapping them, to carry out the functions of withstanding the structural load and to act as a barrier for preventing gas permeation, result in a much lighter vessel compared to conventional vessels using metallic parts. Therefore, the Gravimetric Index (GI), that is, the weight of the vessel/tank vs. weight liquid hydrogen compared to the metallic alternative is also improved.

In addition, the versatility provided by the possibility of manufacturing the FRP structures and the outer FRP material layer for wrapping them once coupled using the composite manufacturing techniques described above, translates into an optimal selection of ply and laminate thicknesses that provides control over the permeability of the vessel and prevents the appearance of the phenomenon of microcracking due to cold embrittlement.

More particularly, the versatility of the method allows the combination of 'thin plies' with 'standard plies' to form the laminates which are part of the FRP structures as well as the FRP material used for wrapping them.

In this sense, it will be understood that ply thickness is normally greater than 0.1 mm. Reducing the ply thickness down to this limit is usually referred to as thin-plies. In the context of the present invention, thin-plies will be considered as plies with a thickness between 0.04 mm and 0.1 mm.

The combination depends on the ratio of the total thickness of the vessel desired to be manufactured using the thin plies. In an embodiment, the at least partially cured FRP structures are composed entirely of thin plies, and the layer of FRP material provided according to step c) is made entirely of standard plies, resulting in a structural combination that optimizes the total time of the layup operations.

With respect to the curing process of the assembly of step d), that is, the assembly formed after coupling the at least partially cured FRP structures to each other according to step b) which are subsequently wrapped by a layer of FRP material provided according to step c), the heating means that are preferably used as instruments or tooling for applying the curing cycle are an autoclave or, alternatively, an oven.

In an embodiment, the method comprises, before step a), manufacturing each at least partially cured FRP structure by applying a partial curing cycle:

at a lower temperature compared to a temperature adapted to complete a curing cycle according to which the FRP structures are completely cured, and/or a shorter duration compared to a duration adapted to complete a curing cycle according to which the FRP structures are completely cured.

In an embodiment, the method comprises, before applying the partial curing cycle, laying up a laminate comprising FRP plies over a mold by Automated Fiber Placement (AFP) or Automated Tape Laying (ATL) techniques.

In an embodiment, the method comprises, before applying the partial curing cycle:

laying-up an ensemble formed by a honeycomb core and, at least on one side on the honeycomb core, from the inside to the outside: a curable adhesive layer and an amorphous thermoplastic film;

laying-up a dry fiber layer over the ensemble;

arranging the dry fiber and ensemble on a one-sided mold and confining it in a gas-tight space by arranging a vacuum sheet over the one-sided mold; and infusing the dry fiber layer under vacuum with resin.

Advantageously, the at least partially cured FRP structures obtained by these steps and comprising a panel with a honeycomb core are provided with an optimized core sealing solution for preventing infused resin from entering into the honeycomb core open cells, thus improving its mechanical properties, especially for curved or highly curved panels.

In an embodiment, at least one at least partially cured FRP structure provided in step a) comprises at least one baffle and/or wall-type element projecting from a surface of the at least partially cured FRP structure towards the interior volume defined when the at least partially cured FRP structures are coupled to each other according to step b).

Sloshing is a known undesirable phenomenon that affects fluids stored within a container or tank and which is caused by the jostling to which the container may be subjected, especially if the container is mounted on a vehicle. As a result of this jostling, lateral forces are exerted on the liquid propellant, tending to cause a non-uniform fluid flow along a longitudinal extent of the container wall and associated non-uniform distribution of the fluid across the width of the container.

The sloshing motion of the fluid can induce significant structural loads and rigid body disturbances which may affect control system operation. The presence of the baffles and/or wall-type elements installed within the inner volume of the vessel, extending inwardly from an inner surface helps to attenuate sloshing.

In an embodiment, two at least partially cured FRP structures provided in step a) are dome-shaped FRP structures, each dome-shaped FRP structure having a convex outer side and a concave inner side.

It shall be understood that, regarding the orientation or disposition of the parts (i.e., the at least partially cured FRP structures) relative to each other, the concave inner side will be oriented towards the interior volume defined when the dome-shaped FRP structures are coupled to each other according to step b).

From an architectural and geometric perspective, a dome-shaped FRP structure, in the sense of the present invention, may be understood as a spherical cap, that is, as any portion of a sphere resulting from being cut by a plane. It may also have slightly different concave-convex shapes such as, for example, a paraboloid shape.

In an embodiment, step a) comprises providing two at least partially cured dome-shaped FRP structures and one at least partially cured cylindrical FRP structure, wherein each dome-shaped FRP structure comprises a convex outer side and a concave inner side; and wherein according to step b), each one of the two dome-shaped FRP structures is coupled to a different end of the at least partially cured cylindrical FRP structure.

In an embodiment, the two dome-shaped FRP structures comprise circular flanges projecting from each respective concave inner side; and the at least partially cured cylindrical FRP structure is sized with a diameter less than or substantially equal to the diameter of the circular flanges of each dome-shaped FRP structure, such that each dome-shaped FRP structure and the at least partially cured cylindrical FRP structure are coupled to each other with a tight fit according to step b), with the circular flanges overlapping the border of the at least partially cured cylindrical FRP structure.

In an embodiment, step b) comprises providing a suction cup and/or adhesive film at the coupling interfaces between each dome-shaped FRP structure and the partially cured cylindrical FRP structure.

Advantageously, the provision of a suction cup system alone or together with the application of adhesive films at the coupling interfaces contributes to secure the relative position between the FRP structures involved.

In an embodiment, the vessel obtained in step e) is a spherical vessel.

The spherical vessel is obtained by the coupling of two hemispherical dome-shaped FRP structures.

In an embodiment, step a) comprises providing one at least partially cured dome-shaped FRP structure and one at least partially cured cylindrical FRP structure which is closed at one of its ends by a spherical portion; wherein according to step b), the dome-shaped FRP structure is coupled to the open end of the at least partially cured cylindrical FRP structure.

In an embodiment, at least one of the dome-shaped FRP structures is provided with at least one breakthrough hole configured for allowing insertion of tubing and for establishing a fluidic communication between the inside and the outside of the vessel.

In an embodiment, the at least partially cured FRP structures provided in step a) are two hemicylindrical structures.

In an embodiment, at least one partially cured FRP structure provided in step a) is dome-shaped having a convex outer the and a concave inner side, and the thickness of at least one dome-shaped FRP structure progressively increases from the coupling interface to a polar area of the dome-shaped FRP structure, where the thickness has its highest value.

It shall be understood that the pole or apex of the dome-shaped FRP structure, which as aforementioned is regarded as having a spherical cap shape, shall correspond to the point of greatest height above a plane comprising the coupling interface section of the dome-shaped FRP structure or, in other words, the plane with which a sphere is cut to obtain the spherical cap. The pole or apex will generally correspond to the end of the vessel once assembled along a determined direction, in particular cases along its longitudinal direction.

Also as aforementioned, the versatility provided by the possibility of manufacturing the FRP structures and the outer FRP material layer for wrapping them once coupled using the composite manufacturing techniques described above, translates into an optimal selection of ply and laminate.

Advantageously, structural reinforcement is achieved in the area of the vessel through which, according to one embodiment of the invention, external elements such as pipes, tubing, or other auxiliary system supports are inserted for the provision and extraction of fluid into and from the interior of the vessel. The structural reinforcement is particularly advantageous in the case in which the tubes are inserted at a step prior to the provision, according to step c), of a layer of FRP material enveloping the dome-shaped FRP structure. The tubes would indeed prevent the provision of the taped layer of FRP material in the polar zone.

In addition, a progressive overthickness of the dome-shaped FRP structure around its polar zone would allow to obtain a homogeneous thickness by controlling the amount of FRP material provided onto the rest of the structure according to step c), despite not being possible to operate in the polar zone due to the presence of pipes, tubing, or other auxiliary system supports.

In an embodiment, the method comprises, after curing the assembly resulting from step c), according to step d), providing at least two outer FRP structures shaped with complementary coupling interfaces configured for matching with each other, such that a sheathing is defined when the outer FRP structures are coupled to each other, the sheathing being sized for encasing the assembly resulting from step d), contacting it on its outer surface;

coupling the outer FRP structures to each other encasing the assembly resulting from step d); and fastening the outer FRP structures after they have been coupled to each other.

The outer FRP structures close on the assembly resulting from step d) as a second skin or sheathing, that is, encasing the at least partially cured FRP structures, as well as the layer of FRP material provided onto at least a portion of the at least partially cured FRP structures. According to this, once coupled, the outer FRP structures are in contact with the assembly resulting from step d). In this way, the outer FRP structures contribute to holding the at least partially cured FRP structures, as well as the layer of FRP material provided onto at least a portion of the at least partially cured FRP structures together, also increasing the overall tightness of the vessel.

Advantageously, the use of these additional outer FRP structures results in a thicker wall of the vessel which reinforces its load bearing capabilities and gas permeation properties.

After the outer FRP structures have been fastened, the resulting assembly is prevented from breaking down, that is, the vessel is prevented from separating and the fluid housed within the inner volume is also prevented from leaking out.

In an embodiment, the outer FRP structures provided are partially cured; and the method comprises applying a curing cycle under vacuum for curing the outer FRP structures after they have been coupled to each other encasing the assembly resulting from step d).

This curing process allows the integration and consolidation of the outer FRP structures present in such a way as to obtain a vessel with homogeneous wall structural features, as a single piece of CFRP. This way, the cured outer FRP structures lock the inner assembly in place.

In an embodiment, the outer FRP structures may comprise complementary coupling means provided on the corresponding coupling interfaces; the complementary coupling means being configured for interlocking with each other such that the relative position of the outer FRP structures is locked thereby. In this regard, examples of complementary geometries to facilitate the coupling of the FRP structures and improve their tightness afterwards may be such as tongue and groove, labyrinth joints, flanges, etc.

In a second inventive aspect, the invention provides a method for manufacturing a vessel configured for housing a fluid within, the method comprising:

providing at least two inner Fiber Reinforced Polymer (FRP) structures shaped with complementary coupling interfaces configured for matching with each other, such that an interior volume is defined when the inner FRP structures are coupled to each other;

coupling the inner FRP structures to each other;

providing at least two outer FRP structures shaped with complementary coupling interfaces configured for matching with each other, such that a sheathing is defined when the outer FRP structures are coupled to each other, the sheathing being sized for encasing the inner FRP structures, contacting them on their outer surface, after they have been coupled to each other;

coupling the outer FRP structures to each other, encasing the inner FRP structures such that the relative position of the inner FRP structures is locked thereby; and fastening the outer FRP structures after they have been coupled to each other.

In a third inventive aspect, the invention provides a method for manufacturing a double-wall tank configured for housing a fluid within, the method comprising:

i) providing a vessel manufactured according to any of the embodiments of the method of the first inventive aspect or the second inventive aspect;

ii) providing at least two at least partially cured Fiber Reinforced Polymer (FRP) tank structures shaped with complementary coupling interfaces configured for matching with each other, such that an interior chamber is defined when the at least partially cured FRP tank structures are coupled to each other, the interior chamber being sized for housing the vessel provided in step i), such that a gap is defined between the outer side of the vessel and the inner side of the at least partially cured FRP tank structures when the vessel is housed within the interior chamber;

iii) coupling the at least partially cured FRP tank structures to each other enclosing the vessel provided in step i) within; wherein at least one spacer is provided between the outer side of the vessel and the inner side of the at least partially cured FRP tank structures for maintaining the at least partially cured FRP tank structures at a predetermined distance from the vessel;

iv) winding at least one layer of FRP material onto at least a portion of the at least partially cured FRP tank structures once coupled to each other; and v) curing the assembly resulting from step iv).

The double-wall tank manufactured by the method comprises essentially three basic structural elements: an inner vessel according to the first or the second inventive aspect provided in step i), intended for housing a fluid within, and which is considered as the inner wall of the so called double-wall tank; an outer wall provided surrounding the inner vessel after coupling the at least partially cured FRP tank structures according to step iii); and an intermediate gap or space disposed between the inner vessel (i.e., inner wall) and the outer wall, the intermediate space intended for providing thermal insulation to the inner vessel, which, in the case of containing a cryo-compressed fluid, such as hydrogen, will be exposed to extremely low temperatures.

Just like the interior volume of the vessel provided in step i), the outer wall of the tank is provided by coupling the at least partially cured FRP tank structures provided in step ii), according to step iii).

In an embodiment, the FRP structures which give rise to the vessel once coupled to each other and the FRP tank structures which give rise to the outer wall of the tank confining the vessel within are subjected to a partial curing cycle under vacuum together in a single stage, thus reducing the total number of steps and associated costs involved in manufacturing a double-wall tank by the method of the invention.

In particular, once they have been pre-cured, the FRP tank structures provided in step ii) are ready to be assembled (i.e., coupled to each other) in such a way as to define the interior chamber where the vessel provided in step i) is intended to be confined. In this sense, it will be understood that the at least partially cured FRP tank structures are provided with a complementary geometry or shape such that they can couple to each other, according to step iii), by means of a coupling interface. In an embodiment, the coupling interface is the contour and boundaries of the at least partially cured FRP tank structures, which are outlined so as to match with each other.

In order to define an intermediate gap or space disposed around the vessel, between its outer side and the outer wall of the tank, at least one spacer is provided onto the vessel for maintaining the outer wall of the tank separated at a predetermined distance from the inner vessel.

In an embodiment, step iii) comprises providing a plurality of discrete mechanical spacers distributed around the vessel for maintaining the distance between the inner wall and the outer wall.

This way of providing a series of separate parts (the at least partially cured FRP tank structures) that are assembled at a later stage to give rise to the final geometry of the outer wall of the double-wall tank, enables the provision and integration of various systems and structural elements inside the tank in an efficient and flexible manner. In particular, a plurality of internal systems, such as pipes, tubing, etc., can be installed separately in the at least partially cured FRP tank structures and/or in the space confined between the inner wall of the tank (i.e., the vessel provided in step i)) and the outer wall of the tank, before the at least partially cured FRP structures are coupled to each other.

In an embodiment, the method comprises evacuating air from within the intermediate gap defined between the vessel and the outer wall of the tank and then sealing this envelope from outer atmosphere, thus creating a vacuum thermal insulation.

In an embodiment, the method comprises, before step iii), providing at least a thermal insulation layer enveloping the vessel.

In an embodiment, in the space confined between the inner wall of the tank (i.e., the vessel provided in step i)) and the outer wall of the tank, an insulating material maintained in a vacuum is provided. The vacuum and insulating material help to reduce heat transfer and thereby reduce the boil-off of the fluid, and more in particular, of liquid oxygen, liquid nitrogen or liquid argon which can be stored within the vessel.

Additionally, by virtue of the aforementioned sequential concept, the method also envisages the provision of 'discontinuities' in the final geometry of the double-wall tank, and more in particular, of the outer wall of the tank. The discontinuities are adapted for the installation and/or insertion of external elements such as pipes, tubing, or other auxiliary system supports.

In an embodiment, the complementary geometries of the coupling surfaces can be shaped such that, when the FRP tank structures are coupled according to step iii), the discontinuities are formed along the joint between the FRP tank structures.

At least one of the discontinuities in the outer wall of the tank may be used as a vacuum port to extract air from between the inner wall and the outer wall, and thus obtain a vacuum thermal insulation.

Advantageously, these discontinuities also contribute to balancing the pressure during, for example, the curing cycle applied in step v), according to which the at least partially cured FRP tank structures coupled to each other, along with the FRP layer provided wrapping (i.e., enveloping) the structures, are completely cured.

Advantageously, the method for manufacturing a double-wall tank of the invention simplifies the tooling concept and reduces the associated resource costs because, after having provided and coupled the FRP tank structures according to step iii), the resulting assembly serves as a male mold onto which the layer of FRP material provided for wrapping the outer wall of the double-wall tank is provided by automated fiber placement or by filament winding techniques.

Furthermore, quality inspections and handling during manufacturing process according to steps iii) and iv) also benefit from the stepwise sequencing and simplified tooling of the method, and thus can be achieved in a more efficient and less resource demanding way.

In an embodiment, the method comprises, before step ii), manufacturing each at least partially cured FRP tank structure by applying a partial curing cycle at a lower temperature and/or shorter duration compared to a complete curing cycle under predetermined duration and temperature conditions according to which the FRP tank structures are completely cured.

In an embodiment, the method comprises, before applying the partial curing cycle, laying up a laminate formed by FRP plies provided over a mold by automated fiber placement or automated tape laying.

In an embodiment, the method comprises, before applying the partial curing cycle:
   laying-up an ensemble formed by a honeycomb core and, at least on one side on the honeycomb core, from the inside to the outside: a curable adhesive layer and an amorphous thermoplastic film;
   laying-up a dry fiber layer over the ensemble;
   arranging the dry fiber and ensemble on a one-sided mold and confining it in a gas-tight space by arranging a vacuum sheet over the one-sided mold; and
   infusing the dry fiber layer under vacuum with resin.

In an embodiment, the method comprises, after curing the assembly resulting from step iv), according to step v):
   providing at least two outer FRP tank structures shaped with complementary coupling interfaces configured for matching with each other, such that a sheathing is defined when the outer FRP structures are coupled to each other, the sheathing being sized for encasing the assembly resulting from step v), contacting it on its outer surface;
   coupling the outer FRP tank structures to each other, encasing the assembly resulting from step v); and
   fastening the outer FRP structures after they have been coupled to each other.

The outer FRP tank structures close on the assembly resulting from step v), as a second skin or sheathing, that is, encasing the at least partially cured FRP tank structures, as well as the layer of FRP material provided onto at least a portion of the at least partially cured FRP tank structures. According to this, once coupled, the outer FRP tank structures are in contact with the assembly resulting from step v). In this way, the outer FRP tank structures contribute to holding the at least partially cured FRP tank structures, as well as the layer of FRP material provided onto at least a portion of the at least partially cured FRP tank structures together.

After the outer FRP tank structures have been fastened, the resulting assembly is prevented from breaking down, that is, the double-wall tank is prevented from separating.

In an embodiment, the outer FRP tank structures provided are partially cured; and the method comprises applying a curing cycle under vacuum for curing the outer FRP tank structures after they have been coupled to each other.

In an embodiment, the outer FRP tank structures may comprise complementary coupling means provided on the corresponding coupling interfaces; the complementary coupling means being configured for interlocking with each other such that the relative position of the outer FRP tank structures is locked thereby. In this regard, examples of complementary geometries to facilitate the coupling of the FRP structures and improve their tightness afterwards may be arrangements such as tongue and groove, labyrinth joints, flanges, etc.

In a fourth inventive aspect, the invention provides a method for manufacturing a double-wall tank configured for housing a fluid within, the method comprising:
   providing an inner vessel manufactured according to any of the embodiments of the method of the first or the second inventive aspect;
   providing at least two inner Fiber Reinforced Polymer (FRP) tank structures shaped with complementary coupling interfaces configured for matching with each other, such that an interior chamber is defined when the inner FRP tank structures are coupled to each other, the interior chamber being sized for housing the vessel provided; such that a gap is defined between the outer side of the inner vessel and the inner side of the inner FRP tank structures when the inner vessel is housed within the interior chamber;
   coupling the inner FRP tank structures to each other enclosing the vessel provided within; wherein at least a spacer is provided between the outer side of the inner vessel and the inner side of the inner FRP tank structures for maintaining the inner FRP tank structures at a predetermined distance from the inner vessel;
   providing at least two outer FRP tank structures shaped with complementary coupling interfaces configured for matching with each other, such that a sheathing is defined when the outer FRP tank structures are coupled to each other, the sheathing being sized for encasing the inner FRP tank structures, contacting them on their outer surface, after they have been coupled to each other;
   coupling the outer FRP tank structures to each other, encasing the inner FRP tank structures, such that the relative position of the inner FRP tank structures is locked thereby; and
   fastening the outer FRP tank structures after they have been coupled to each other.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The present invention provides a method for manufacturing a vessel (10) configured for housing a fluid within.

This method comprises at least the following steps:

a) providing at least two at least partially cured Fiber Reinforced Polymer (FRP) structures (11, 12) shaped with complementary coupling interfaces (11.1, 12.1) configured for matching with each other, such that an interior volume is defined when the at least partially cured FRP structures (11, 12) are coupled to each other;

b) coupling the at least partially cured FRP structures (11, 12) to each other such that the interior volume is defined;

c) winding at least one layer (13) of FRP material onto at least a portion of the at least partially cured FRP structures (11, 12) once coupled to each other; and d) curing the assembly resulting from step c).

Figure 1:
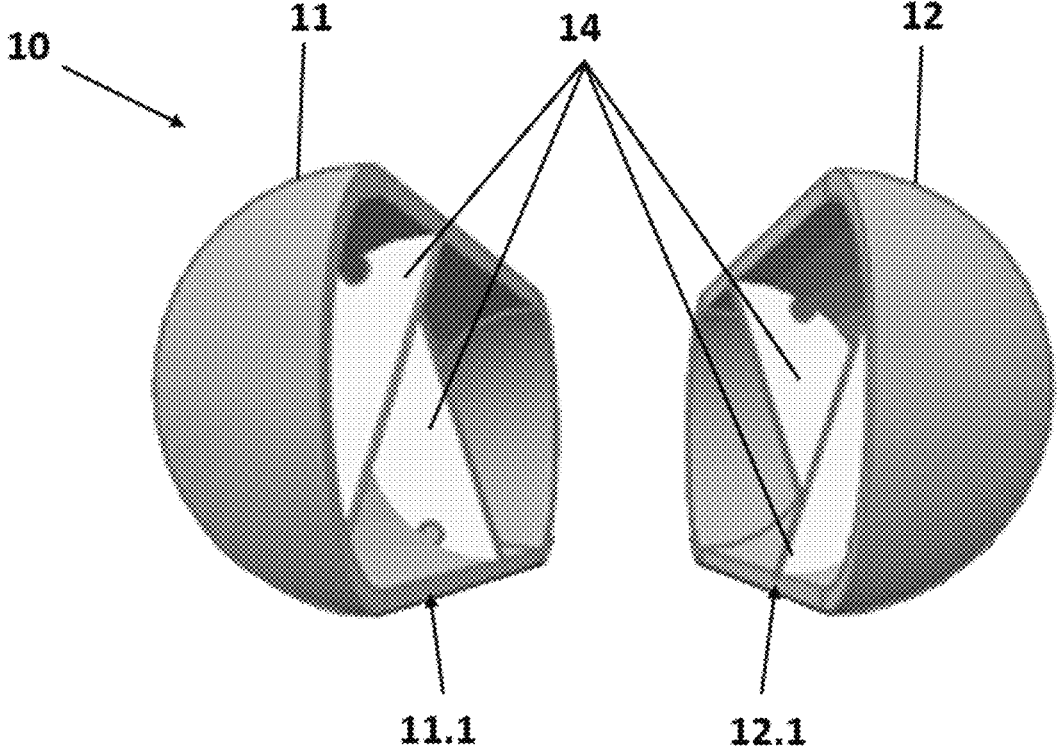
FIG. 1 shows a perspective view of two at least partially cured FRP structures provided according to steps of a method for manufacturing a vessel according to an embodiment of the present invention.

FIG. 1 shows some of the manufacturing steps that the present method follows to obtain a vessel (10) according to an embodiment. Particularly, FIG. 1 shows the provision of two closed hemicylindrical at least partially cured FRP structures (11, 12) according to step a), the FRP structures (11, 12) comprising a cylindrical central portion with two spherical portions located at the opposite ends of the cylindrical central portion. More in particular, both FRP structures (11, 12) are complementary and, once coupled, they define a capsule-type structure closed at its ends by means of respective spherical cap portions.

In the particular embodiment shown, both hemicylindrical structures (11, 12) have been previously manufactured by applying a partial curing cycle at a lower temperature and/or shorter duration compared to a complete curing cycle under predetermined duration and temperature conditions according to which the FRP structures (11, 12) are completely cured.

With respect to the layup techniques carried out for obtaining the preform of each FRP structure (11, 12) prior to the application of the partial curing cycle, according to different embodiments of the above method, the layup techniques may be one of the following:

Laying up a laminate formed by FRP plies provided over a mold by Automated Fiber Placement (AFP) or Automated Tape Laying (ATL) techniques.

Laying-up an ensemble formed by a honeycomb core and, at least on one side on the honeycomb core, from the inside to the outside: a curable adhesive layer and an amorphous thermoplastic film; laying-up a dry fiber layer over the ensemble; arranging the dry fiber and ensemble on a one-sided mold and confining it in a gas-tight space by arranging a vacuum sheet over the one-sided mold; and infusing the dry fiber layer under vacuum with resin.

As it can be seen in FIG. 1, each hemicylindrical structure (11, 12) comprises two wall-type elements (14) projecting from each corresponding inner surface towards the cylindrical interior volume defined when the hemicylindrical structures (11, 12) are coupled to each other according to step b) of the above method.

In the particular embodiment shown, the wall-type elements (14) are anti-sloshing walls.

As previously described, the sloshing motion of the fluid housed within the vessel (10) can induce significant structural loads and rigid body disturbances which may affect control system operation. The presence of the anti-sloshing walls (14) installed within the inner volume of the vessel (10), extending inwardly from an inner surface helps to attenuate sloshing of the fluid.

The anti-sloshing walls (14) are depicted having complementary geometries. In particular, the anti-sloshing walls (14) shown are divided into two halves which are respectively provided on opposite surfaces of different hemicylindrical structures (11, 12), in such a way that, when the hemicylindrical structures (11, 12) are coupled according to step b), the complementary anti-sloshing walls (14) are arranged in a particular cross-section of the vessel (10), facing each other and separated a distance in such a way that their opposite contours define a nearly rectangular gap for allowing the fluid housed within the vessel (10) to flow therethrough.

With respect to the layup techniques carried out for providing the anti-sloshing walls (14) on the inner surface of each hemicylindrical structure (11, 12), an embodiment of the method of the invention comprises, before applying the partial curing cycle: laying up a corresponding laminate forming each anti-sloshing wall (14) over the hemicylindrical structure (11, 12), the laminate being laid up preferably by ATL or AFP techniques.

Figure 2:
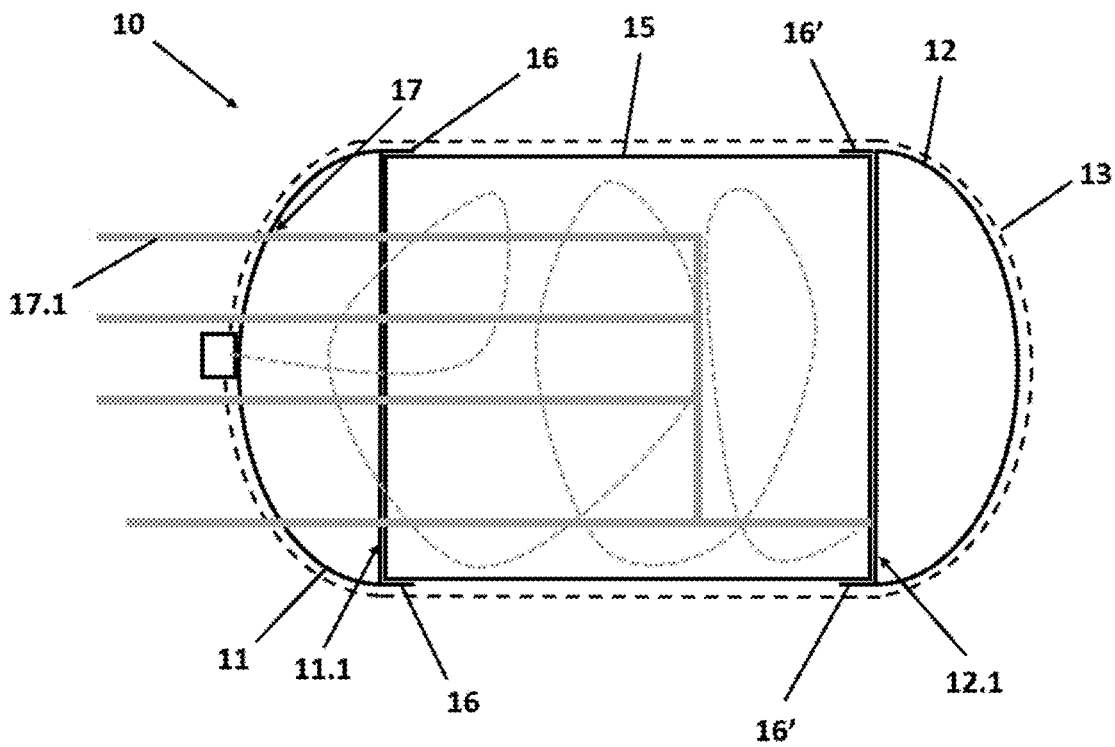
FIG. 2 shows a perspective view of three at least partially cured FRP structures steps coupled together and wrapped with a layer of FRP material enveloping the at least partially cured FRP structures according to steps of a method for manufacturing a vessel according to an embodiment of the present invention.

According to another embodiment, FIG. 2 shows some of the manufacturing steps of the present method. FIG. 2 shows some of the manufacturing steps that the present method follows to obtain a vessel (10) according to an embodiment. Particularly, FIG. 2 depicts a longitudinal cross-sectional view of a vessel (10) showing the provision of two dome-shaped FRP structures (11, 12) according to step a) of the above method.

As it can be seen in the embodiment shown, each dome-shaped FRP structure (11, 12) comprises a convex outer side and a concave inner side, the concave inner side being oriented towards the interior volume of the vessel (10) after all the at least partially cured FRP structures (11, 12, 15) have been coupled to each other according to step b).

An additional at least partially cured FRP structure (15) is provided according to step a). As it can be seen, at least partially cured cylindrical FRP structure (15) is coupled to the two dome-shaped FRP structures (11, 12). In particular, the two dome-shaped FRP structures (11, 12) comprise circular flanges (16) projecting from each respective concave inner side. The at least partially cured cylindrical FRP structure (15) is sized with a diameter less than or substantially equal to the diameter of the circular flanges (16) of each dome-shaped FRP structure (11, 12).

As it can be seen, each dome-shaped FRP structure (11, 12) is coupled to a different end of the at least partially cured FRP cylindrical structure (15) with a tight fit according to step b), with the circular flanges (16) overlapping the border of the at least partially cured cylindrical FRP structure (15).

As with the hemicylindrical structures (11, 12) of FIG. 1, the two dome-shaped FRP structures and the at least partially cured FRP cylindrical structure (15) have been previously manufactured by applying a partial curing cycle at a lower temperature and/or shorter duration compared to a complete curing cycle under predetermined duration and temperature conditions according to which the three FRP structures (11, 12, 15) are completely cured.

With respect to the layup techniques carried out for obtaining the preform of each FRP structure (11, 12, 15) prior to the application of the partial curing cycle, according to different embodiments of the above method, the layup techniques may be one of the following:

Laying up a laminate formed by FRP plies provided over a mold by Automated Fiber Placement (AFP) or Automated Tape Laying (ATL) techniques.

Laying-up an ensemble formed by a honeycomb core and, at least on one side on the honeycomb core, from the inside to the outside: a curable adhesive layer and an amorphous thermoplastic film; laying-up a dry fiber layer over the ensemble; arranging the dry fiber and ensemble on a one-sided mold and confining it in a gas-tight space by arranging a vacuum sheet over the one-sided mold; and infusing the dry fiber layer under vacuum with resin.

In the embodiment of the method shown in FIG. 2, step b) comprises providing a suction cup and/or adhesive film at the coupling interfaces (11.1, 12.1) between each dome-shaped FRP structure (11, 12) and the at least partially cured cylindrical FRP structure (15).

FIG. 2 also shows the provision in one dome-shaped FRP structure (11) of several breakthrough holes (17) through which a plurality of pipes (17.1) are inserted for the provision and extraction of fluid into and from the interior of the vessel (10).

A fluid level sensor in the form of an optical guide is also shown arranged inside the vessel (10) represented by a dashed line.

Finally, the embodiment shown in FIG. 2 also represents the provision, according to step c), of a layer (13) of FRP material enveloping the at least partially cured FRP structures (11, 12, 15) once coupled to each other according to step b). In particular, the resulting assembly is shown entirely wrapped by the layer (13) which, according to different embodiments of the method of the invention, can be provided preferably by Automated Fiber Placement (AFP), or by filament winding techniques. For illustrative purposes, the layer (13) of FRP material is represented with a dashed line surrounding the contour whole vessel (10).

In an alternative embodiment, step a) comprises providing one at least partially cured dome-shaped FRP structure and one at least partially cured cylindrical FRP structure which is closed at one of its ends by a spherical portion; wherein the dome-shaped FRP structure is coupled to the open end of the at least partially cured cylindrical FRP structure according to step b), the resulting geometry of the vessel (10) being identical to that of the vessel (10) shown in FIG. 2.

Figure 3:
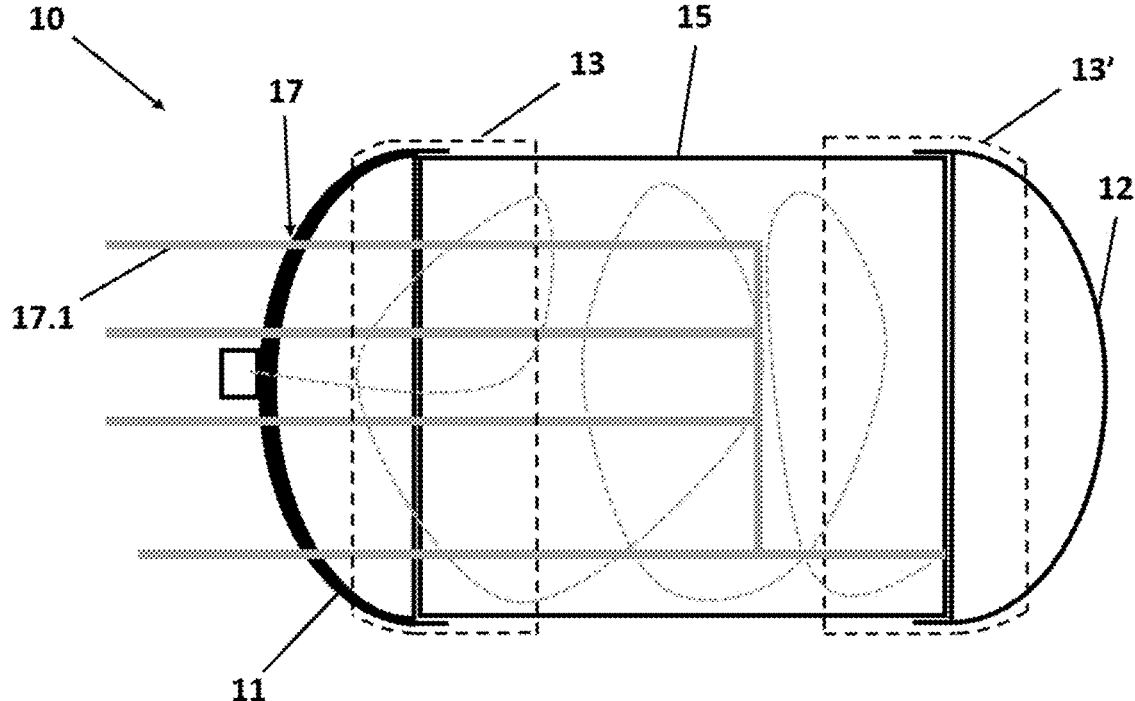
FIG. 3 shows a perspective view of three at least partially cured FRP structures steps coupled together and wrapped with a layer of FRP material enveloping the at least partially cured FRP structures according to steps of a method for manufacturing a vessel according to an embodiment of the present invention.

FIG. 3 shows an embodiment similar to that of FIG. 2. In particular, in the same manner as in FIG. 2, FIG. 3 depicts a longitudinal cross-sectional view of a vessel (10) showing the provision of two dome-shaped FRP structures (11, 12) according to step a) of the above method.

As it can be seen in the embodiment shown, each dome-shaped FRP structure (11, 12) is coupled to a different end of the at least partially cured FRP cylindrical structure (15) with a tight fit according to step b).

However, in the embodiment shown in FIG. 3, it can be seen that the thickness of the dome-shaped FRP structure (11) which is provided with several breakthrough holes (17) through which a plurality of pipes (17.1) is inserted, progressively increases from the coupling interface with the at least partially cured FRP cylindrical structure (15) to the polar area of the dome-shaped FRP structure (11).

Advantageously, structural reinforcement is achieved in the polar area of the vessel (10) through which the plurality of pipes (17.1) is inserted.

In this regard, the embodiment shown in FIG. 2 also represents the provision, according to step c), of two layers (13, 13') of FRP material enveloping the at least partially cured FRP structures (11, 12, 15) once coupled to each other according to step b). In particular, the resulting assembly is shown comprising the two layers (13), which for illustrative purposes are represented with dashed lines, surrounding the coupling interfaces between each dome-shaped FRP structure (11, 12) and the at least partially cured cylindrical FRP structure (15).

Thereby, the weight of the vessel (10) may be optimized by winding FRP material only at specific areas of the vessel (10) at which the FRP structures (11, 12, 15) are joined to each other.

The present invention also provides a method for manufacturing a double-wall tank (20) configured for housing a fluid within.

This method comprises:
i) providing a vessel (10) manufactured according to one of the methods described above;
ii) providing at least two at least partially cured fiber reinforced polymer (FRP) tank structures (21, 22) shaped with complementary coupling interfaces (21.1, 22.1) configured for matching with each other, such that an interior chamber is defined when the at least partially cured FRP tank structures (21, 22) are coupled to each other, the interior chamber being sized for housing the vessel (10) provided in step a), such that a gap is defined between the outer side of the vessel (10) and the inner side of the at least partially cured FRP tank structures (21, 22) when the vessel (10) is housed within the interior chamber;
iii) coupling the at least partially cured FRP tank structures (21, 22) to each other enclosing the vessel (10) provided in step a) within; wherein at least a spacer (24) is provided between the outer side of the vessel (10) and the inner side of the at least partially cured FRP tank structures (21, 22) for maintaining the at least partially cured FRP tank structures (21, 22) at a predetermined distance from the vessel (10);
iv) winding at least one layer (23) of FRP material onto at least a portion of the at least partially cured FRP tank structures (21, 22) once coupled to each other; and
v) curing the assembly resulting from step iv).

Figure 4:
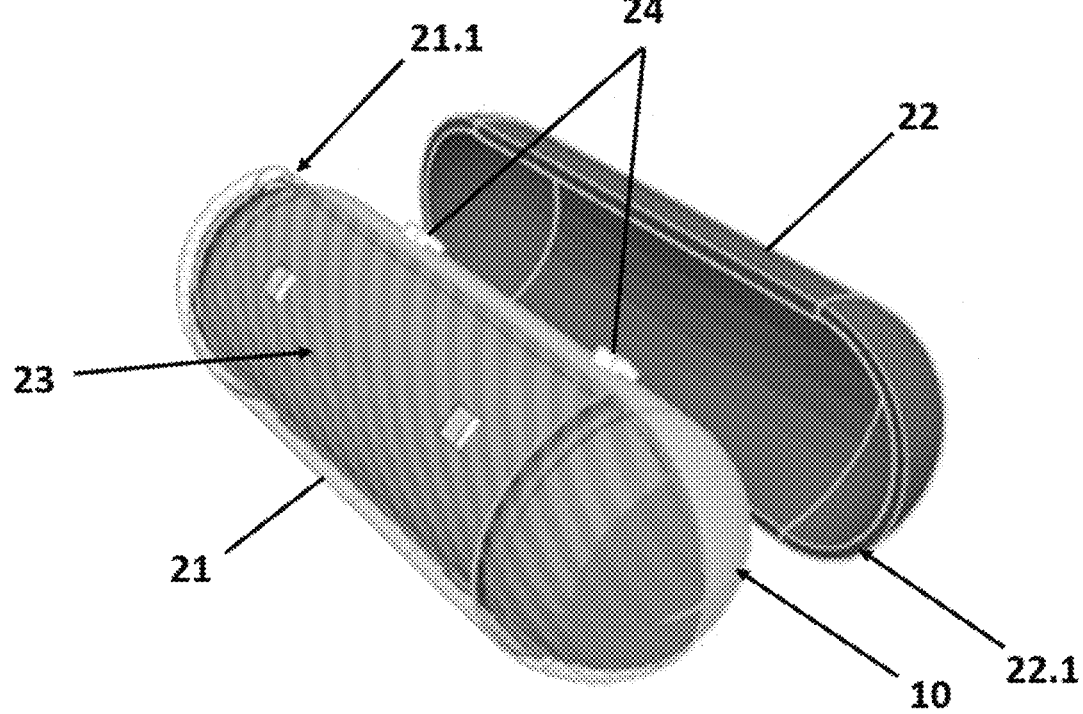
FIG. 4 shows a perspective view of two at least partially cured FRP tank structures provided around a vessel according to steps of a method for manufacturing a double-wall tank according to an embodiment of the present invention.

FIG. 4 shows some of the manufacturing steps that the present method follows to obtain a double-wall tank (20) according to an embodiment. Particularly, FIG. 4 shows the provision of a vessel (10) according to step i), as well as the provision of two hemicylindrical at least partially cured FRP tank structures (21, 22) according to step ii).

In the particular embodiment shown, both hemicylindrical tank structures (21, 22) have been previously manufactured by applying a partial curing cycle at a lower temperature and/or shorter duration compared to a complete curing cycle under predetermined duration and temperature conditions according to which the hemicylindrical tank structures (21, 22) are completely cured.

With respect to the layup techniques carried out for obtaining the preform of each FRP tank structure (21, 22) prior to the application of the partial curing cycle, according to different embodiments of the above method, the layup techniques may be one of the following:

Laying up a laminate formed by FRP plies provided over a mold by Automated Fiber Placement (AFP) or Automatic Tape Laying (ATL) techniques.

Laying-up an ensemble formed by a honeycomb core and, at least on one side on the honeycomb core, from the inside to the outside: a curable adhesive layer and an amorphous thermoplastic film; laying-up a dry fiber layer over the ensemble; arranging the dry fiber and ensemble on a one-sided mold and confining it in a gas-tight space by arranging a vacuum sheet over the one-sided mold; and infusing the dry fiber layer under vacuum with resin.

The embodiment of a double-wall tank (20) manufactured by the method of FIG. 4 also comprises a thermal insulation layer (not shown) enveloping the vessel (10) provided in step i). The thermal insulation layer is arranged in the space confined between the inner wall of the tank (i.e., the vessel (10)) and the outer wall of the tank (20). In an embodiment, the method comprises maintaining the thermal insulation layer in a vacuum.

Furthermore, in order to define an intermediate gap disposed around the vessel (10), between its outer side and the outer wall of the tank (20), a plurality of spacers (24) are provided onto the outer surface of the vessel (10) for maintaining the outer wall of the tank (20) (which in the particular example shown in FIG. 4 is formed by the two hemicylindrical at least partially cured FRP tank structures (21, 22)) at a predetermined distance from the inner vessel (10).

As it can be seen, the spacers (24) are embodied as a plurality of discrete mechanical spacers (24) provided with a rectangular cross-section and distributed around the vessel (10).

Finally, the embodiment shown in FIG. 4 also represents the provision, according to step IV), of a layer (23) of FRP material enveloping the hemicylindrical tank structures (21, 22) once coupled to each other according to step iii). In particular, the resulting assembly is shown partially wrapped by the layer (23) which, according to different embodiments of the method of the invention, can be provided preferably by Automated Fiber Placement (AFP), or by filament winding techniques. For illustrative purposes, the layer (23) of FRP material is represented with parallel grey stripes over one hemicylindrical tank structure (21).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a vessel configured for housing a fluid within, the method comprising:
   a) providing at least two at least partially cured fiber reinforced polymer (FRP) structures shaped with complementary coupling interfaces configured to match with each other, such that an interior volume is defined when the at least partially cured FRP structures are coupled to each other to form an assembly;
   b) coupling the at least partially cured FRP structures to each other such that the interior volume is defined;
   c) winding at least one layer of FRP material onto at least a portion of the at least partially cured FRP structures once coupled to each other; and
   d) curing the assembly resulting from step c),
   wherein before step a), manufacturing each at least partially cured FRP structure by applying a partial curing cycle, at least one of:
   at a lower temperature compared to a temperature adapted to complete a curing cycle according to which the FRP structures are completely cured, or
   a shorter duration compared to a duration adapted to complete a curing cycle according to which the FRP structures are completely cured,
   wherein before applying the partial curing cycle:
   laying-up an ensemble formed by a honeycomb core and, at least on one side on the honeycomb core, from the inside to the outside of the honeycomb core: a curable adhesive layer and an amorphous thermoplastic film;
   laying-up a dry fiber layer over the ensemble;
   arranging the dry fiber layer and ensemble on a one-sided mold and confining it in a gas-tight space by arranging a vacuum sheet over the one-sided mold; and
   infusing the dry fiber layer under vacuum with resin.

2. The method according to claim 1 further comprising, before applying the partial curing cycle, laying up a laminate comprising FRP plies over a mold by Automated Fiber Placement or Automatic Tape Laying techniques.

3. The method according to claim 1, wherein at least one at least partially cured FRP structure provided in step a) comprises at least one of at least one baffle or wall element projecting from an inner surface of the at least partially cured FRP structure towards the interior volume defined when the at least partially cured FRP structures are coupled to each other according to step b).

4. The method according to claim 1, wherein two at least partially cured FRP structures provided in step a) are dome-shaped FRP structures, each dome-shaped FRP structure having a convex outer side and a concave inner side.

5. The method according to claim 4,
   wherein an at least partially cured cylindrical FRP structure is provided in step a);
   wherein the two dome-shaped FRP structures comprise circular flanges projecting from each respective concave inner side; and
   wherein the at least partially cured cylindrical FRP structure is sized with a diameter less than or substantially equal to the diameter of the circular flanges of each dome-shaped FRP structure, such that each dome-shaped FRP structure and the at least partially cured cylindrical FRP structure are coupled to each other with a tight fit according to step b), with the circular flanges overlapping a border of the at least partially cured cylindrical FRP structure.

6. The method according to claim 4, wherein at least one of the dome-shaped FRP structures is provided with at least one breakthrough hole configured for allowing insertion of tubing and for establishing a fluidic communication between the inside and the outside of the vessel.

7. The method according to claim 1, wherein at least one partially cured FRP structure provided in step a) is dome-shaped having a convex outer side and a concave inner side, and a thickness of the dome-shaped FRP structure progressively increases from the coupling interface to a polar area of the dome-shaped FRP structure.

8. A method for manufacturing a double-wall tank configured for housing a fluid within, the method comprising:
   i) providing a vessel manufactured according to the following steps:
      a) providing at least two at least partially cured fiber reinforced polymer (FRP) structures shaped with complementary coupling interfaces configured to match with each other, such that an interior volume is defined when the at least partially cured FRP structures are coupled to each other to form an assembly:
      b) coupling the at least partially cured FRP structures to each other such that the interior volume is defined;
      c) winding at least one layer of FRP material onto at least a portion of the at least partially cured FRP structures once coupled to each other; and
      d) curing the assembly resulting from step c), and
   ii) providing at least two at least partially cured fiber reinforced polymer (FRP) tank structures shaped with complementary coupling interfaces configured for matching with each other, such that an interior chamber is defined when the at least partially cured FRP tank structures are coupled to each other, the interior chamber being sized for housing the vessel provided in step i), such that a gap is defined between the outer side of the vessel and the inner side of the at least partially cured FRP tank structures when the vessel is housed within the interior chamber;
   iii) coupling the at least partially cured FRP tank structures to each other enclosing the vessel provided in step i) within; wherein at least a spacer is provided between the outer side of the vessel and the inner side of the at least partially cured FRP tank structures for maintaining the at least partially cured FRP tank structures at a predetermined distance from the vessel;
   iv) winding at least one layer of FRP material onto at least a portion of the at least partially cured FRP tank structures once coupled to each other to form an assembly; and
   v) curing the assembly resulting from step iv).

9. The method according to claim 8 further comprising, before step iii), providing at least a thermal insulation layer enveloping the vessel.

10. The method according to claim 8, further comprising, before step ii), manufacturing each at least partially cured FRP tank structure by applying a partial curing cycle at a lower temperature and/or shorter duration compared to a complete curing cycle under predetermined duration and temperature conditions at which the FRP tank structures are completely cured.

11. The method according to claim 10 further comprising, before applying the partial curing cycle, laying up a laminate formed by FRP plies provided over a mold by Automated Fiber Placement or Automated Tape Laying techniques.

12. The method according to claim 10, further comprising, before applying the partial curing cycle:
   laying-up an ensemble formed by a honeycomb core and, at least on one side on the honeycomb core, from the inside to the outside: a curable adhesive layer and an amorphous thermoplastic film;
   laying-up a dry fiber layer over the ensemble;
   arranging the dry fiber layer and ensemble on a one-sided mold and confining it in a gas-tight space by arranging a vacuum sheet over the one-sided mold; and
   infusing the dry fiber layer under vacuum with resin.

13. A method for manufacturing a double-wall tank configured for housing a fluid within, the method comprising:
   a) providing a vessel manufactured according to claim 1;
   b) providing an outer wall defining an interior chamber sized for housing the vessel provided in step a), such that a gap is defined between the outer side of the vessel and the inner side of the outer wall when the vessel is housed within the interior chamber.

14. The method according to claim 13, wherein the outer wall provided in step b) is an FRP structure manufactured by Automated Fiber Placement or Automated Tape Laying techniques.

15. The method according to claim 13, wherein step b) comprises providing at least two inner FRP tank structures shaped with complementary coupling interfaces configured for matching with each other, such that the interior chamber is defined when the inner FRP tank structures are coupled to each other, such that a gap is defined between the outer side of the vessel and the inner side of the inner FRP tank structures when the vessel is housed within the interior chamber;
   coupling the inner FRP tank structures to each other enclosing the vessel provided within; wherein at least a spacer is provided between the outer side of the inner vessel and the inner side of the inner FRP tank structures for maintaining the inner FRP tank structures at a predetermined distance from the inner vessel;
   providing at least two outer FRP tank structures shaped with complementary coupling interfaces configured for matching with each other, such that a sheathing is defined when the outer FRP tank structures are coupled to each other, the sheathing being sized for encasing the inner FRP tank structures, contacting them on their outer surface, after they have been coupled to each other;
   coupling the outer FRP tank structures to each other, encasing the inner FRP tank structures, such that a relative position of the inner FRP tank structures is locked thereby; and
   fastening the outer FRP tank structures after they have been coupled to each other.

16. A method for manufacturing a double-wall tank configured for housing a fluid within, the method comprising:
   i) providing a vessel manufactured according to claim 1;
   ii) providing at least two at least partially cured FRP tank structures shaped with complementary coupling interfaces configured for matching with each other, such that an interior chamber is defined when the at least partially cured FRP tank structures are coupled to each other, the interior chamber being sized for housing the vessel provided in step i), such that a gap is defined between the outer side of the vessel and the inner side of the at least partially cured FRP tank structures when the vessel is housed within the interior chamber;

iii) coupling the at least partially cured FRP tank structures to each other enclosing the vessel provided in step i) within; wherein at least a spacer is provided between the outer side of the vessel and the inner side of the at least partially cured FRP tank structures for maintaining the at least partially cured FRP tank structures at a predetermined distance from the vessel;

iv) winding at least one layer of FRP material onto at least a portion of the at least partially cured FRP tank structures once coupled to each other to form an assembly; and v) curing the assembly resulting from step iv).

17. The method according to claim 16, wherein the vessel provided in step i) is a FRP structure manufactured by Automated Fiber Placement or Automated Tape Laying techniques.

18. The method according to claim 16, wherein step i) comprises providing at least two inner FRP structures shaped with complementary coupling interfaces configured for matching with each other, such that an interior volume is defined when the inner FRP structures are coupled to each other;

coupling the inner FRP structures to each other;

providing at least two outer FRP structures shaped with complementary coupling interfaces configured for matching with each other, such that a sheathing is defined when the outer FRP structures are coupled to each other, the sheathing being sized for encasing the inner FRP structures, contacting them on their outer surface, after they have been coupled to each other;

coupling the outer FRP structures to each other, encasing the inner FRP structures such that a relative position of the inner FRP structures is locked thereby; and fastening the outer FRP structures after they have been coupled to each other.

* * * * *